(12) United States Patent
Karas

(10) Patent No.: US 11,618,383 B2
(45) Date of Patent: Apr. 4, 2023

(54) VEHICULAR VISION SYSTEM WITH DISPLAY OF COMBINED IMAGES

(71) Applicant: Magna Electronics Inc., Auburn Hills, MI (US)

(72) Inventor: Peter Karas, Grossostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/649,835

(22) Filed: Feb. 3, 2022

(65) Prior Publication Data

US 2022/0153194 A1 May 19, 2022

Related U.S. Application Data

(63) Continuation of application No. 16/947,777, filed on Aug. 17, 2020, now Pat. No. 11,242,004, which is a continuation of application No. 16/155,921, filed on Oct. 10, 2018, now Pat. No. 10,744,941.

(60) Provisional application No. 62/571,450, filed on Oct. 12, 2017.

(51) Int. Cl.
*B60R 1/00* (2022.01)
*G08G 1/16* (2006.01)

(52) U.S. Cl.
CPC ............. *B60R 1/00* (2013.01); *G08G 1/168* (2013.01); *B60R 2300/105* (2013.01); *B60R 2300/303* (2013.01); *B60R 2300/607* (2013.01); *B60R 2300/806* (2013.01)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,790,403 | A | 8/1998 | Nakayama |
| 5,949,331 | A | 9/1999 | Schofield et al. |
| 6,344,805 | B1 | 2/2002 | Yasui et al. |
| 6,515,597 | B1 | 2/2003 | Wada et al. |

(Continued)

FOREIGN PATENT DOCUMENTS

| | | |
|---|---|---|
| DE | 20105340 U1 | 7/2001 |
| DE | 102005051777 A1 | 6/2006 |

(Continued)

*Primary Examiner* — Eileen M Adams
(74) *Attorney, Agent, or Firm* — Honigman LLP

(57) ABSTRACT

A vehicular vision system includes a rear backup camera at a vehicle. During a driving maneuver, the system partitions each frame of image data captured by the rear backup camera into (i) a left side image data portion, (ii) a right side image data portion and (iii) a rear image data portion. During the driving maneuver, and based at least in part on motion of the vehicle, the system (i) combines left side image data portions of multiple frames of captured image data and (ii) combines right side image data portions of multiple frames of captured image data. During the driving maneuver, the video display displays (i) video images derived from the rear image data portion, video images derived from the combined left side image data portions and the combined right side image data portions for viewing by the driver of the vehicle during the driving maneuver of the vehicle.

30 Claims, 1 Drawing Sheet

(56) References Cited

U.S. PATENT DOCUMENTS

| | | |
|---|---|---|
| 6,539,288 B2 | 3/2003 | Ishida et al. |
| 6,690,268 B2 | 2/2004 | Schofield et al. |
| 6,734,896 B2 | 5/2004 | Nobori et al. |
| 6,785,403 B1 | 8/2004 | Murakami et al. |
| 7,038,577 B2 | 5/2006 | Pawlicki et al. |
| 7,161,616 B1 | 1/2007 | Okamoto et al. |
| 7,308,341 B2 | 12/2007 | Schofield et al. |
| 7,317,813 B2 | 1/2008 | Yanagawa et al. |
| 7,720,580 B2 | 5/2010 | Higgins-Luthman |
| 7,855,755 B2 | 12/2010 | Weller et al. |
| 8,874,317 B2 | 10/2014 | Marczok et al. |
| 10,744,941 B2 | 8/2020 | Karas |
| 10,744,974 B2 | 8/2020 | Sato et al. |
| 11,242,004 B2 | 2/2022 | Karas |
| 2012/0062743 A1 | 3/2012 | Lynam et al. |
| 2012/0162427 A1 | 6/2012 | Lynam |
| 2013/0250114 A1 | 9/2013 | Lu |
| 2014/0043473 A1 | 2/2014 | Gupta et al. |
| 2014/0333729 A1 | 11/2014 | Pflug |
| 2014/0340510 A1 | 11/2014 | Ihlenburg et al. |
| 2015/0022664 A1 | 1/2015 | Pflug et al. |
| 2015/0258989 A1* | 9/2015 | Okano ............... B60W 40/105 701/1 |
| 2015/0344028 A1 | 12/2015 | Gieseke et al. |
| 2016/0039409 A1* | 2/2016 | Hayakawa ........... G06V 20/586 701/70 |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0253237 A1 | 9/2017 | Diessner |
| 2017/0317748 A1 | 11/2017 | Krapf |
| 2017/0329346 A1 | 11/2017 | Latotzki |

FOREIGN PATENT DOCUMENTS

| | | |
|---|---|---|
| DE | 10292327 B4 | 6/2009 |
| EP | 1115250 A1 | 7/2001 |
| EP | 1265195 A2 | 12/2002 |
| JP | 3099952 | 4/1991 |
| JP | 848198 | 2/1996 |
| JP | 09193710 | 7/1997 |
| JP | 10175482 | 6/1998 |
| JP | 10211849 | 8/1998 |
| JP | 2001088609 | 4/2001 |
| JP | 2001114047 A | 4/2001 |
| JP | 3813085 B2 | 8/2006 |
| JP | 3886376 B2 | 2/2007 |
| JP | 4156214 B2 | 9/2008 |
| JP | 4724522 B2 | 7/2011 |
| JP | 2016053942 A | 4/2016 |

\* cited by examiner

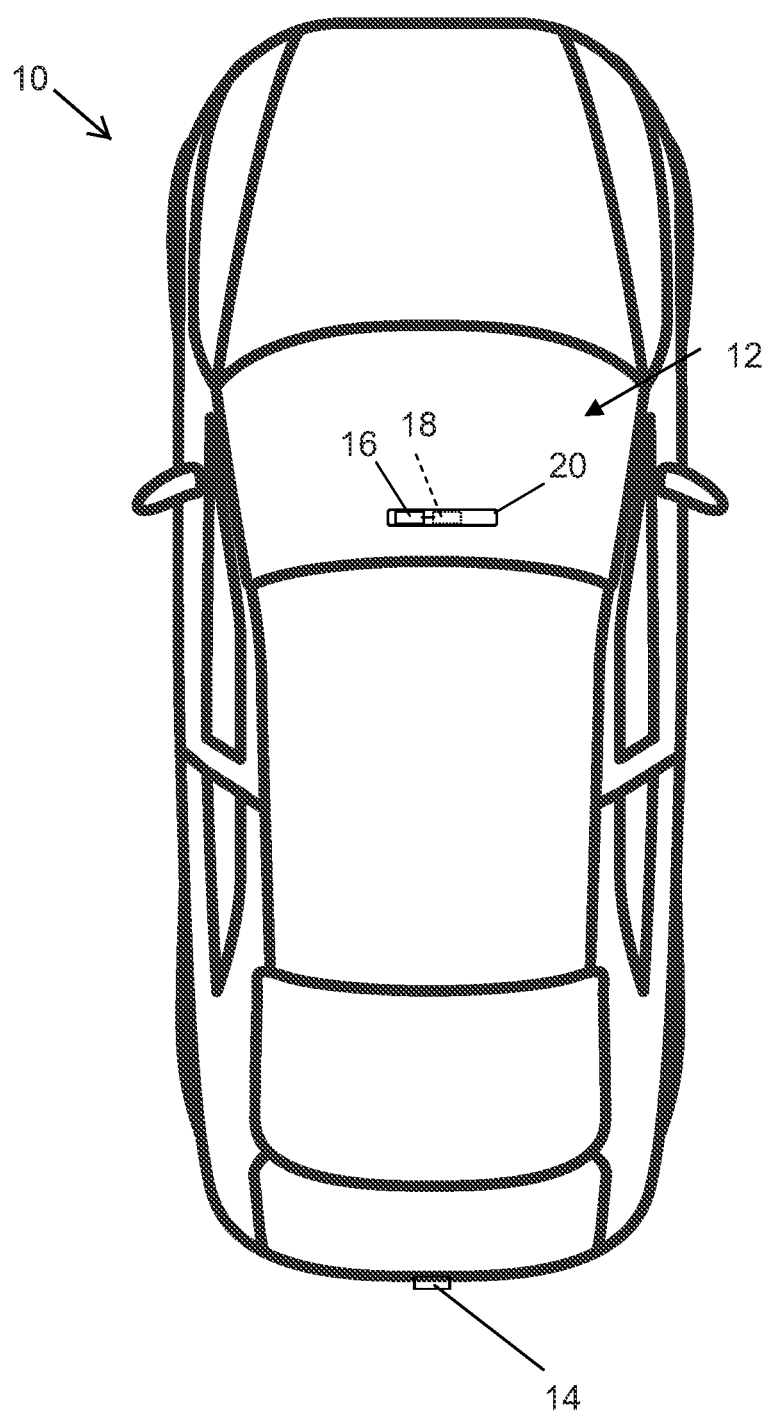

VEHICULAR VISION SYSTEM WITH DISPLAY OF COMBINED IMAGES

CROSS REFERENCE TO RELATED APPLICATIONS

The present application is a continuation of U.S. patent application Ser. No. 16/947,777, filed Aug. 17, 2020, now U.S. Pat. No. 11,242,004, which is a continuation of U.S. patent application Ser. No. 16/155,921, filed Oct. 10, 2018, now U.S. Pat. No. 10,744,941, which claims the filing benefits of U.S. provisional application Ser. No. 62/571,450, filed Oct. 12, 2017, which is hereby incorporated herein by reference in its entirety.

FIELD OF THE INVENTION

The present invention relates generally to a vehicle vision system for a vehicle and, more particularly, to a vehicle vision system that utilizes a rear backup camera disposed at the rear of a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes a rearward viewing camera to capture multiple frames of image data representative of images exterior of the vehicle as the vehicle moves forward or rearward, and combines captured image data to provide a bird's eye view image display for viewing by the driver of the vehicle when maneuvering the vehicle into a parking space. The system utilizes vehicle motion information and, responsive to image processing of image data captured by the camera, utilizes software based algorithms to generate, for each frame of captured image data, a left side bird's eye view image portion, a right side bird's eye view image portion and rear bird's eye view image portion. The system combines the left side, right side and rear bird's eye view image portions of multiple frames of captured image data to generate combined bird's eye view images. The system displays the combined bird's eye view images for viewing by a driver of the vehicle during a parking maneuver of the vehicle.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a vision system that incorporates a rearward viewing camera in accordance with the present invention.

DESCRIPTION OF THE PREFERRED EMBODIMENTS

A vehicle vision system and/or driver assist system and/or object detection system and/or alert system operates to capture image data representative of the view or scene exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. The vision system provides display, such as a rearview display or a top down or bird's eye or surround view display or the like.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14 (and the vehicle may optionally include multiple exterior viewing imaging sensors or cameras, such as a forward viewing camera at the front (or at the windshield) of the vehicle, and a sideward/rearward viewing camera at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system of the present invention comprises an electronic device for generating a video stream signal with content providing an image showing a bird's eye view of the surroundings of a vehicle utilizing only image data captured by the rear backup camera as input data. The electronic device records the video image data from the rear camera and processes it as historical video data content for recreating the side area view content of the vehicle's surroundings at the left and right sides of the vehicle as the vehicle moves forward or rearward. The electronic device utilizes information about the motion of the vehicle provided by the vehicle (such as the speed and steering angle of the vehicle as may be provided via a vehicle communication network or bus) and the image content from the rear camera image data for creating the bird's eye view.

The electronic device utilizes software based algorithms that generate a left side bird's eye view image portion, a right side bird's eye view image portion and rear bird's eye view image portion based on the raw image coming from the rear view camera. All three image view portions match each other on a combined bird's eye view image without any additional image manipulation based on the combined bird's eye view image.

Thus, the system and device of the present invention does not stitch the image data of multiple frames of captured image data based on a bird's eye view. The system combines the image data based on the single raw views. The system does not perform image tweaking in the top view to have it match and look seamless.

The three single image portions are generated in that way, that they must match when being displayed all together. No pattern matching algorithms are utilized to stitch the three image portions seamlessly. Instead, the system generates images in an accurate manner, so that no post manipulation of the bird's eye combined view will be necessary. This is accomplished by providing enhanced initial transformation of the three single view portions.

As the vehicle moves, for example, rearward, while capturing image data via the rear backup camera, the control combines the left image portions over multiple frames of captured image data, and combines the right image portions over multiple frames of captured image data, and combines the rear image portions over multiple frames of captured image data. The combined left image portions provide, as the vehicle moves rearward, a view of the region to the left side of the vehicle, including regions that were in the field of view of the rear backup camera, but now are not. Likewise, the combined right image portions provide, as the vehicle moves rearward, a view of the region to the right side of the vehicle, including regions that were in the field of view of the rear backup camera, but now are not. Thus, the system provides a top-down or birds-eye view of the left and right side regions. When the vehicle is traveling in a straight line and at a constant speed, the raw image data may be combined to generate the combined image views. As the vehicle is turned or as the speed changes, the control takes the speed data or information and the steering angle data or information into account to adapt the combining of the image portions so that the displayed combined images represent what is at that time the region along the respective side of the vehicle.

Thus, the vision system of the present invention captures multiple frames of image data with the rearward viewing camera as the vehicle moves forward or rearward. The system or control utilizes vehicle motion information and, responsive to image processing of image data captured by the camera, utilizes software based algorithms to generate, for each frame of captured image data, a left side bird's eye view image portion, a right side bird's eye view image portion and rear bird's eye view image portion. The system utilizes vehicle motion information to generate the image portions and to combine the respective portions to generate a bird's eye view of the area surrounding the vehicle. The system combines left side bird's eye view image portions of multiple frames of captured image data, right side bird's eye view image portions of multiple frames of captured image data, and rear bird's eye view image portion of multiple frames of captured image data to generate combined bird's eye view images. The system displays the combined bird's eye view images for viewing by a driver of the vehicle during a parking maneuver of the vehicle. For example, the system may capture image data via the rearward viewing camera as the vehicle is driven forward past a parking space or forward into a parking space. The system generates and combines the image portions of the frames of captured image data based on the vehicle motion information, so that combined bird's eye view images can be displayed to the driver of the vehicle as the driver maneuvers the vehicle toward and into the parking space.

The system may capture and store the image data and combined images, so that, if the vehicle first drives forward past a parking space (while the camera is capturing image data and the control is processing the captured image data to generate the birds-eye view images), and then reverses into the parking space (such as for a parallel parking maneuver), the control may display birds-eye view images based on the image data captured during the forward travel of the vehicle while the vehicle is reversing into the parking space. The displayed images may be adjusted based on vehicle information or data, such as speed and steering angle of the vehicle when the image data was first captured and the current speed and steering angle of the vehicle as the vehicle is reversing into the parking space.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The video display device may utilize aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, and/or International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
a rear backup camera disposed at a rear portion of a vehicle equipped with the vehicular vision system and having a field of view exterior and rearward of the equipped vehicle, the rear backup camera capturing frames of image data as the equipped vehicle moves forward or rearward;
wherein the rear backup camera comprises an imaging array having at least one million photosensor elements arranged in rows and columns;
an electronic control unit (ECU) comprising an image processor that processes multiple frames of image data captured by the rear backup camera during a driving maneuver of the equipped vehicle;
a video display disposed in the equipped vehicle and viewable by a driver of the equipped vehicle, the video display operable to display video images derived from image data captured by the rear backup camera;
wherein, during the driving maneuver, the vehicular vision system partitions each frame of a plurality of frames of image data captured by the rear backup camera, via processing at the image processor of image data captured solely by the rear backup camera, into (i) a left side image data portion representative of the ground rearward of and to the left of the equipped vehicle, (ii) a right side image data portion representative of the ground rearward of and to the right of the equipped vehicle and (iii) a rear image data portion representative of the ground rearward of the equipped vehicle;
wherein the vehicular vision system (i) combines left side image data portions of multiple frames of image data captured solely by the rear backup camera during the driving maneuver and (ii) combines right side image data portions of multiple frames of image data captured solely by the rear backup camera during the driving maneuver;
wherein, during the driving maneuver, the left side image data portions are combined based at least in part on motion of the equipped vehicle and the right side image data portions are combined based at least in part on motion of the equipped vehicle; and
wherein, during the driving maneuver, the video display displays (i) video images derived from the rear image data portion, (ii) video images derived from the combined left side image data portions and (iii) video images derived from the combined right side image data portions for viewing by the driver of the equipped vehicle during the driving maneuver of the equipped vehicle.

2. The vehicular vision system of claim 1, wherein the combined left side image data portions are combined without stitching of image data and the combined right side image data portions are combined without stitching of image data.

3. The vehicular vision system of claim 1, wherein the vehicular vision system records video image data captured by the rear backup camera and processes it as historical video data content for recreating left side area content and right side area content during the driving maneuver.

4. The vehicular vision system of claim 1, wherein, during the driving maneuver, (i) the left side image data portions are combined based at least in part on speed of the equipped vehicle during the driving maneuver and (ii) the right side image data portions are combined based at least in part on speed of the equipped vehicle during the driving maneuver.

5. The vehicular vision system of claim 1, wherein, during the driving maneuver, (i) the left side image data portions are combined based at least in part on steering angle of the equipped vehicle during the driving maneuver and (ii) the right side image data portions are combined based at least in part on steering angle of the equipped vehicle during the driving maneuver.

6. The vehicular vision system of claim 5, wherein, during the driving maneuver, and responsive to a change in steering angle of the equipped vehicle, the vehicular vision system adapts combining of the left side image data portions and combining of the right side image data portions based on the steering angle of the equipped vehicle so that the displayed video images derived from the combined left side image data portions and the displayed video images derived from the combined right side image data portions represent what is at the region along the respective sides of the equipped vehicle during the driving maneuver.

7. The vehicular vision system of claim 1, wherein vehicle motion data indicative of the motion of the equipped vehicle is provided to the ECU via a communication network of the equipped vehicle.

8. The vehicular vision system of claim 1, wherein the image data captured by the rear backup camera is provided to the ECU via a communication network of the equipped vehicle.

9. The vehicular vision system of claim 1, wherein the vehicular vision system combines rear image data portions of multiple frames of image data captured solely by the rear backup camera during the driving maneuver, and wherein during the driving maneuver, the rear image data portions are combined based at least in part on the motion of the equipped vehicle, and wherein, during the driving maneuver, the video display displays video images derived from the combined rear image data portions for viewing by the driver of the equipped vehicle during the driving maneuver of the equipped vehicle.

10. The vehicular vision system of claim 9, wherein the combined left side image data portions, the combined right side image data portions and the combined rear image data portions are combined for displaying combined video images at the video display for viewing by the driver of the equipped vehicle during the driving maneuver of the equipped vehicle.

11. The vehicular vision system of claim 1, wherein the driving maneuver comprises forward motion of the equipped vehicle.

12. The vehicular vision system of claim 11, wherein the driving maneuver comprises a parking maneuver of the equipped vehicle.

13. The vehicular vision system of claim 1, wherein the driving maneuver comprises rearward motion of the equipped vehicle.

14. A vehicular vision system, the vehicular vision system comprising:
a rear backup camera disposed at a rear portion of a vehicle equipped with the vehicular vision system and having a field of view exterior and rearward of the equipped vehicle, the rear backup camera capturing frames of image data as the equipped vehicle moves forward or rearward;
wherein the rear backup camera comprises an imaging array having at least one million photosensor elements arranged in rows and columns;
an electronic control unit (ECU) comprising an image processor that processes multiple frames of image data captured by the rear backup camera during a driving maneuver of the equipped vehicle;
a video display disposed in the equipped vehicle and viewable by a driver of the equipped vehicle, the video display operable to display video images derived from image data captured by the rear backup camera;
wherein, during the driving maneuver, the vehicular vision system partitions each frame of a plurality of frames of image data captured by the rear backup camera, via processing at the image processor of image data captured solely by the rear backup camera, into (i) a left side image data portion representative of the ground rearward of and to the left of the equipped vehicle, (ii) a right side image data portion representative of the ground rearward of and to the right of the equipped vehicle and (iii) a rear image data portion representative of the ground rearward of the equipped vehicle;
wherein the vehicular vision system (i) combines left side image data portions of multiple frames of image data captured solely by the rear backup camera during the driving maneuver and (ii) combines right side image data portions of multiple frames of image data captured solely by the rear backup camera during the driving maneuver;
wherein, during the driving maneuver, (i) the left side image data portions are combined based at least in part on steering angle of the equipped vehicle during the driving maneuver and (ii) the right side image data portions are combined based at least in part on steering angle of the equipped vehicle during the driving maneuver;
wherein the combined left side image data portions are combined without stitching of image data and the combined right side image data portions are combined without stitching of image data; and
wherein, during the driving maneuver, the video display displays (i) video images derived from the rear image data portion, (ii) video images derived from the combined left side image data portions and (iii) video images derived from the combined right side image data portions for viewing by the driver of the equipped vehicle during the driving maneuver of the equipped vehicle.

15. The vehicular vision system of claim 14, wherein the vehicular vision system records video image data captured by the rear backup camera and processes it as historical video data content for recreating left side area content and right side area content during the driving maneuver.

16. The vehicular vision system of claim 14, wherein, during the driving maneuver, (i) the left side image data portions are combined based at least in part on speed of the equipped vehicle during the driving maneuver and (ii) the right side image data portions are combined based at least in part on speed of the equipped vehicle during the driving maneuver.

17. The vehicular vision system of claim 14, wherein, during the driving maneuver, and responsive to a change in steering angle of the equipped vehicle, the vehicular vision system adapts combining of the left side image data portions and combining of the right side image data portions based on the steering angle of the equipped vehicle so that the displayed video images derived from the combined left side image data portions and the displayed video images derived from the combined right side image data portions represent what is at the region along the respective sides of the equipped vehicle during the driving maneuver.

18. The vehicular vision system of claim 14, wherein the vehicular vision system combines rear image data portions of multiple frames of image data captured solely by the rear backup camera during the driving maneuver, and wherein during the driving maneuver, the rear image data portions are combined based at least in part on the steering angle of the equipped vehicle, and wherein, during the driving maneuver, the video display displays video images derived from the combined rear image data portions for viewing by the driver of the equipped vehicle during the driving maneuver of the equipped vehicle.

19. The vehicular vision system of claim 18, wherein the combined left side image data portions, the combined right side image data portions and the combined rear image data portions are combined for displaying combined video images at the video display for viewing by the driver of the equipped vehicle during the driving maneuver of the equipped vehicle.

20. The vehicular vision system of claim 14, wherein the driving maneuver comprises forward motion of the equipped vehicle.

21. The vehicular vision system of claim 20, wherein the driving maneuver comprises a parking maneuver of the equipped vehicle.

22. The vehicular vision system of claim 14, wherein the driving maneuver comprises rearward motion of the equipped vehicle.

23. A vehicular vision system, the vehicular vision system comprising:
a rear backup camera disposed at a rear portion of a vehicle equipped with the vehicular vision system and having a field of view exterior and rearward of the equipped vehicle, the rear backup camera capturing frames of image data as the equipped vehicle moves forward or rearward;
wherein the rear backup camera comprises an imaging array having at least one million photosensor elements arranged in rows and columns;
an electronic control unit (ECU) comprising an image processor that processes multiple frames of image data captured by the rear backup camera during a driving maneuver of the equipped vehicle;
a video display disposed in the equipped vehicle and viewable by a driver of the equipped vehicle, the video display operable to display video images derived from image data captured by the rear backup camera;
wherein, during the driving maneuver, the vehicular vision system partitions each frame of a plurality of frames of image data captured by the rear backup camera, via processing at the image processor of image data captured solely by the rear backup camera, into (i) a left side image data portion representative of the ground rearward of and to the left of the equipped vehicle, (ii) a right side image data portion representative of the ground rearward of and to the right of the equipped vehicle and (iii) a rear image data portion representative of the ground rearward of the equipped vehicle;
wherein the vehicular vision system (i) combines left side image data portions of multiple frames of image data captured solely by the rear backup camera during the driving maneuver and (ii) combines right side image data portions of multiple frames of image data captured solely by the rear backup camera during the driving maneuver;
wherein, during the driving maneuver, (i) the left side image data portions are combined based at least in part on speed of the equipped vehicle and steering angle of the equipped vehicle during the driving maneuver and (ii) the right side image data portions are combined based at least in part on speed of the equipped vehicle and steering angle of the equipped vehicle during the driving maneuver; and
wherein, during the driving maneuver, the video display displays (i) video images derived from the rear image data portion, (ii) video images derived from the combined left side image data portions and (iii) video images derived from the combined right side image data portions for viewing by the driver of the equipped vehicle during the driving maneuver of the equipped vehicle.

24. The vehicular vision system of claim 23, wherein the vehicular vision system records video image data captured by the rear backup camera and processes it as historical video data content for recreating left side area content and right side area content during the driving maneuver.

25. The vehicular vision system of claim 23, wherein, during the driving maneuver, and responsive to a change in steering angle of the equipped vehicle, the vehicular vision system adapts combining of the left side image data portions and combining of the right side image data portions based on the steering angle of the equipped vehicle so that the displayed video images derived from the combined left side image data portions and the displayed video images derived from the combined right side image data portions represent what is at the region along the respective sides of the equipped vehicle during the driving maneuver.

26. The vehicular vision system of claim 23, wherein the vehicular vision system combines rear image data portions of multiple frames of image data captured solely by the rear backup camera during the driving maneuver, and wherein during the driving maneuver, the rear image data portions are combined based at least in part on speed of the equipped vehicle and steering angle of the equipped vehicle, and wherein, during the driving maneuver, the video display displays video images derived from the combined rear image data portions for viewing by the driver of the equipped vehicle during the driving maneuver of the equipped vehicle.

27. The vehicular vision system of claim 26, wherein the combined left side image data portions, the combined right side image data portions and the combined rear image data portions are combined for displaying combined video images at the video display for viewing by the driver of the equipped vehicle during the driving maneuver of the equipped vehicle.

28. The vehicular vision system of claim 23, wherein the driving maneuver comprises forward motion of the equipped vehicle.

29. The vehicular vision system of claim 28, wherein the driving maneuver comprises a parking maneuver of the equipped vehicle.

30. The vehicular vision system of claim 23, wherein the driving maneuver comprises rearward motion of the equipped vehicle.

* * * * *